(12) United States Patent
Van Boeyen

(10) Patent No.: US 10,396,366 B2
(45) Date of Patent: Aug. 27, 2019

(54) BIPOLAR PLATE HAVING A POLYMERIC COATING

(71) Applicant: Nuvera Fuel Cells, LLC, Billerica, MA (US)

(72) Inventor: Roger Van Boeyen, Westford, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 69 days.

(21) Appl. No.: 15/271,330

(22) Filed: Sep. 21, 2016

(65) Prior Publication Data

US 2017/0092962 A1 Mar. 30, 2017

Related U.S. Application Data

(60) Provisional application No. 62/222,866, filed on Sep. 24, 2015.

(51) Int. Cl.
| | | |
|---|---|---|
| *H01M 8/0221* | (2016.01) | |
| *H01M 8/0267* | (2016.01) | |
| *H01M 8/0284* | (2016.01) | |
| *H01M 8/0202* | (2016.01) | |
| *H01M 8/0228* | (2016.01) | |

(Continued)

(52) U.S. Cl.
CPC ....... *H01M 8/0221* (2013.01); *H01M 8/0202* (2013.01); *H01M 8/0228* (2013.01); *H01M 8/0267* (2013.01); *H01M 8/0273* (2013.01); *H01M 8/0284* (2013.01); *H01M 8/0286* (2013.01)

(58) Field of Classification Search
None
See application file for complete search history.

(56) References Cited

U.S. PATENT DOCUMENTS

| | | | | |
|---|---|---|---|---|
| 5,422,196 A | * | 6/1995 | Klein ................. | H01M 2/0255 429/101 |
| 2003/0096151 A1 | * | 5/2003 | Blunk ................ | H01M 8/0206 429/492 |

(Continued)

FOREIGN PATENT DOCUMENTS

JP 2007-012300 1/2007

OTHER PUBLICATIONS

Iizuka et al. (JP, 2007-012300) (a raw machine translation) (Abstract, Detailed Description & Drawings) (Jun. 28, 2005).*

(Continued)

*Primary Examiner* — Carmen V Lyles-Irving
(74) *Attorney, Agent, or Firm* — Finnegan, Henderson, Farabow, Garrett & Dunner, LLP

(57) ABSTRACT

The present disclosure is direct to a bipolar plate of an electrochemical cell. The bipolar plate may have a frame and a base. The bipolar plate may also have a polymeric coating applied to at least one of the frame and the base. The present disclosure is also directed to a method of assembling a bipolar plate for an electrochemical cell. The method may include compressing a frame and a base of the bipolar plate, at least one of the frame and the base has a polymeric coating. The polymeric coating may be an electrical insulator for the electrochemical cell, a seal for sealing one or more zones of the electrochemical cell, and a corrosion protection later of the electrochemical cell.

16 Claims, 3 Drawing Sheets

(51) Int. Cl.
*H01M 8/0273* (2016.01)
*H01M 8/0286* (2016.01)

(56) References Cited

U.S. PATENT DOCUMENTS

| | | | | |
|---|---|---|---|---|
| 2003/0157391 A1* | 8/2003 | Coleman | ................. | C23C 22/02 |
| | | | | 429/465 |
| 2010/0196784 A1* | 8/2010 | Kimura | ............... | H01M 8/0206 |
| | | | | 429/483 |
| 2011/0058970 A1* | 3/2011 | Hugenroth | ............ | F01C 21/104 |
| | | | | 418/13 |

OTHER PUBLICATIONS

PCT Notification of Transmittal of the International Search Report and the Written Opinion of the International Searching Authority, in International Application No. PCT/US2016/052811, dated Nov. 11, 2016.

\* cited by examiner

BIPOLAR PLATE HAVING A POLYMERIC COATING

This application claims the benefit of U.S. Provisional Application No. 62/222,286, filed Sep. 24, 2015, which is incorporated by reference in its entirety.

The present disclosure is directed towards a bipolar plate, and more particularly, a bipolar plate having a polymeric coating.

Electrochemical cells, usually classified as fuel cells or electrolysis cells, are devices used for generating current from chemical reactions, or inducing a chemical reaction using a flow of current. A fuel cell converts the chemical energy of a fuel (e.g., hydrogen, natural gas, methanol, gasoline, etc.) and an oxidant (air or oxygen) into electricity and waste products of heat and water. A basic fuel cell comprises a negatively charged anode, a positively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms may electrochemically split into electrons and protons (hydrogen ions) at the anode. The electrons flow through the circuit to the cathode and generate electricity, while the protons diffuse through the electrolyte membrane to the cathode. At the cathode, hydrogen protons may react with electrons and oxygen (supplied to the cathode) to produce water and heat.

An electrolysis cell represents a fuel cell operated in reverse. A basic electrolysis cell functions as a hydrogen generator by decomposing water into hydrogen and oxygen gases when an external electric potential is applied. The basic technology of a hydrogen fuel cell or an electrolysis cell can be applied to electrochemical hydrogen manipulation, such as, electrochemical hydrogen compression, purification, or expansion. Electrochemical hydrogen manipulation has emerged as a viable alternative to the mechanical systems traditionally used for hydrogen management.

In operation, a single fuel cell can generally generate about 1 volt. To obtain the desired amount of electrical power, individual fuel cells are combined to form a fuel cell stack. The fuel cells are stacked together sequentially, each cell including a cathode, an electrolyte membrane, and an anode. Each cathode/membrane/anode assembly constitutes a "membrane electrode assembly", or "MEA", which is typically supported on both sides by bipolar plates. Gases (hydrogen and air) are supplied to the electrodes of the MEA through channels, grooves, or other passages formed in the plates, which are known as flow fields. In addition to providing mechanical support, the bipolar plates (also known as flow field plates or separator plates) physically separate individual cells in a stack while electrically connecting them. The bipolar plates also act as current collectors, provide access channels for the fuel and the oxidant to the respective electrode surfaces, and provide channels for the removal of water formed during operation of the cell. Typically, bipolar plates are made from metals, for example, stainless steel, titanium, etc., and from non-metallic electrical conductors, for example, graphite.

Additionally, a typical fuel cell stack may include fluid manifolds and inlet ports for directing the fuel and oxidant to the anode and cathode flow fields, respectively. The stack may also include a fluid manifold and inlet port for directing a coolant fluid to interior channels within the stack to absorb heat generated during operation of the individual cells. A fuel cell stack may also include exhaust manifolds and outlet ports for expelling the unreacted gases and the coolant water.

FIG. 1 is an exploded schematic view showing the various components of a prior art PEM fuel cell 10. As illustrated, bipolar plates 2 flank the "membrane electrode assembly" (MEA), which comprises an anode 7A, a cathode 7C, and an electrolyte membrane 8. Hydrogen atoms supplied to anode 7A are electrochemically split into electrons and protons (hydrogen ions). The electrons flow through an electric circuit to cathode 7C and generate electricity in the process, while the protons move through electrolyte membrane 8 to cathode 7C. At the cathode, protons combine with electrons and oxygen (supplied to the cathode) to produce water and heat.

Additionally, prior art electrochemical cell 10 comprises electrically-conductive gas diffusion layers (GDLs) 5 within the cell on each side of the MEA. GDLs 5 serve as diffusion media enabling the transport of gases and liquids within the cell, provide electrical conduction between bipolar plates 2 and electrolyte membrane 8, aid in the removal of heat and process water from the cell, and in some cases, provide mechanical support to electrolyte membrane 8. GDLs 5 can comprise a woven or non-woven carbon cloth with electrodes 7A and 7C located on the sides facing the electrolyte membrane. In some cases, the electrodes 7A and 7C may include an electrocatalyst material coated onto either the adjacent GDL 5 or the electrolyte membrane 8. Some high pressure or high differential pressure fuel cells use "frit"-type densely sintered metals, screen packs, expanded metals, metal foam, or three-dimensional porous metallic substrates in combination with or as a replacement for traditional GDLs to provide structural support to the MEA in combination with traditional, land-channel flow fields 4 formed in the bipolar plates 2. In some high pressure or high differential pressure cells, metal foams or three-dimensional porous metallic substrates can be used as a replacement for traditional channel-type flow fields 4 as well.

In a typical fuel cell, reactant gases on each side of the electrolyte membrane flow through the three-dimensional porous metallic flow fields or the traditional channel-type flow fields and then diffuse through the porous GDL to reach the electrolyte membrane. Since the flow field and the GDL are positioned contiguously and are coupled by the internal fluid streams, the flow field and the GDL are collectively referred to as "flow structure" hereinafter, unless specified otherwise. It is within the scope of the present disclosure to use traditional channel-type flow fields in combination with three-dimensional porous metallic GDLs, to use three-dimensional porous metallic flow fields in combination with traditional GDLs, or to use three-dimensional porous metallic substrates as both flow fields and GDLs.

In a typical fuel cell, there are various components within the fuel cell performing a variety of functions. For example, one or more seals (e.g., elastomeric) may be used to seal different compartments, ports, and/or manifolds of the fuel cell, one or more components may be configured to provide corrosion protection (e.g., cladded), and one or more components may be configured to act as an electrical insulator (e.g., coated). Having separate components or materials within the fuel cell for sealing, corrosion protection, and electrical insulation increases the complexity of manufacturing and assembly, increases material cost, and therefore increases the overall cost. Successful commercialization of hydrogen as an energy carrier and the long-term sustainability of a "hydrogen economy" depend largely on the efficiency and cost-effectiveness of fuel cells and electrolysis cell. Accordingly, the present disclosure is directed to bipolar plates configured to reduce the complexity and cost of manufacturing and assembly.

One aspect of the present disclosure is directed to a bipolar plate for an electrochemical cell. The bipolar plate may include a frame and a base. The bipolar plate may also include a polymeric coating applied to at least one of the frame and the base.

Another aspect of the present disclosure is directed to a method of assembling a bipolar plate for an electrochemical cell. The method may include compressing the bipolar plate, wherein the bipolar plate includes a frame and a base. At least one of the frame and the base may have a polymeric coating. The polymeric coating may be an electrical insulator for the electrochemical cell, a seal for sealing one or more zones of the electrochemical cell, and a corrosion protection later of the electrochemical cell.

Another aspect of the present disclosure is directed to a bipolar plate of an electrochemical cell. The bipolar plate may consist essentially of a frame, a base, and a polymeric coating. The polymeric coating may be an electrical insulator of the electrochemical cell, a seal for sealing one or more zones of the electrochemical cell, and a corrosion protection later of the electrochemical cell.

Another aspect of the present disclosure is directed to an electrochemical cell that may include a pair of bipolar plates and a membrane electrode assembly located between the pair of bipolar plates. At least one of the bipolar plates may include a polymeric coating.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the present disclosure and together with the description, serve to explain the principles of the disclosure.

Reference will now be made in detail to the present exemplary embodiments of the present disclosure, examples of which are illustrated in the accompanying drawings. Wherever possible, the same reference numbers will be used throughout the drawings to refer to the same or like parts. Although described in relation to an electrochemical cell for compressing hydrogen, it is understood that the devices and methods of the present disclosure may be employed with various types of fuel cells and electrochemical cells, including, but not limited to electrolysis cells, hydrogen purifiers, hydrogen expanders, and hydrogen pumps.

Figure 1:
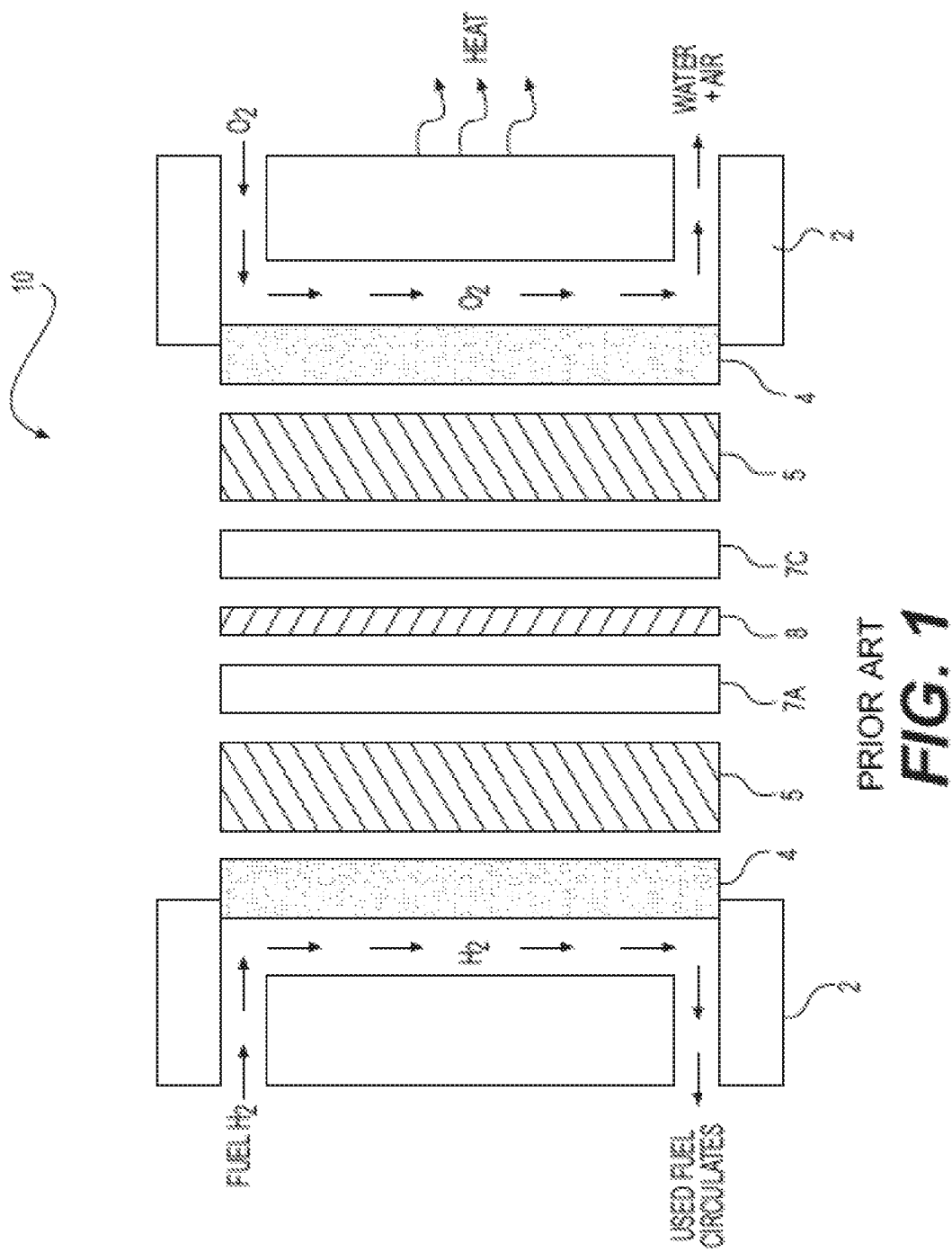
FIG. 1 illustrates an exploded schematic view showing the various components of a prior art Proton Exchange Membrane (PEM) fuel cell.
Figure 2:
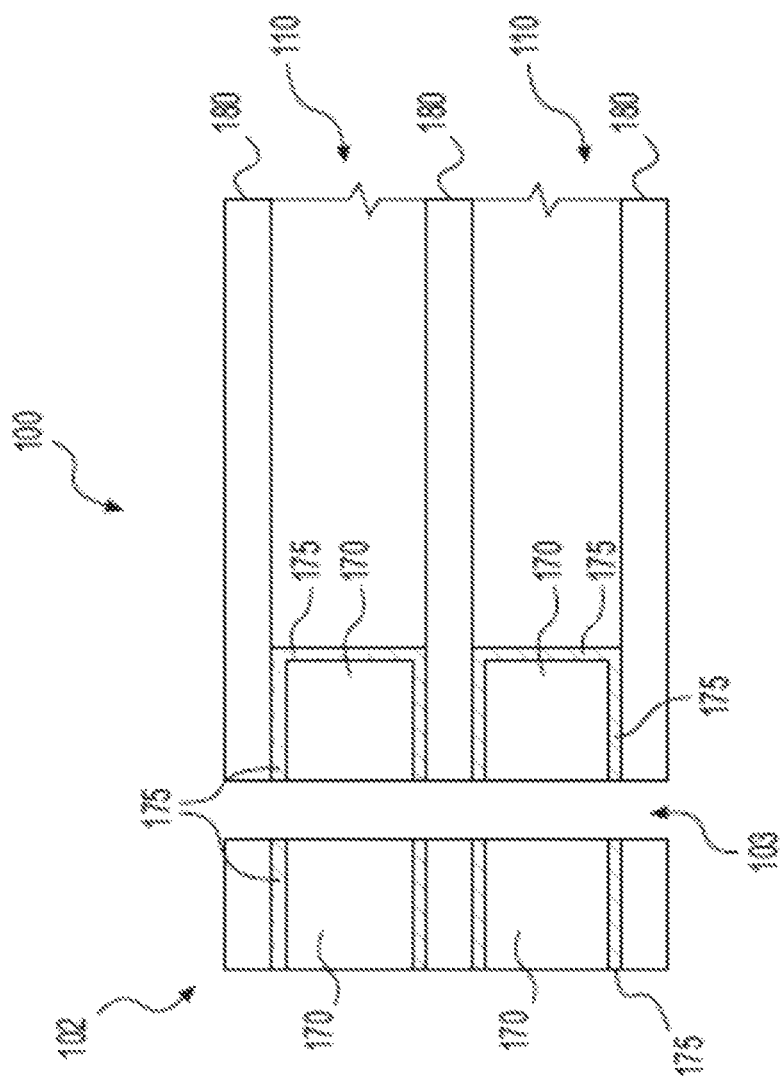
FIG. 2 is a schematic diagram of two electrochemical cells in an electrochemical cell stack with bipolar plates, according to an exemplary embodiment.

As shown in FIG. 1, an electrochemical cell 10 may include a pair of bipolar plates 2 and an anode 7A, cathode 7C, and electrolyte membrane 8 may be disposed therebetween. A plurality of electrochemical cells may be arranged adjacent one another to form an electrochemical stack. For example, FIG. 2 shows a schematic of a portion of two electrochemical cells of an electrochemical stack 100, according to an exemplary embodiment. Electrochemical stack 100, as shown in FIG. 2, may include two or more electrochemical cells 110. As shown in FIG. 2, each electrochemical cell 110 may be sandwiched between two bipolar plates 102.

Bipolar plates 102 may act as support plates, conductors, provide passages to the respective electrode surfaces for the fuel, and provide passages for the removal of the compressed fuel. In some embodiments, bipolar plates 102 may also include access channels for cooling fluid (i.e., water, glycol, or water glycol mixture). As shown in FIG. 2, electrochemical stack may include one or more fluid manifolds 103 that extend through bipolar plates 102 and separator plates 101 of stack 100. Fluid manifolds 103 may be configured to direct the fuel and oxidant to the anode and cathode flow fields, respectively. Although not shown in FIG. 2, stack 100 may also include fluid manifolds for directing a coolant fluid to interior channels within the stack to absorb heat generated during operation of the individual cells. Additionally, although not shown in FIG. 2, stack 100 may also include exhaust manifolds for expelling the unreacted gases and the coolant water.

Figure 3:
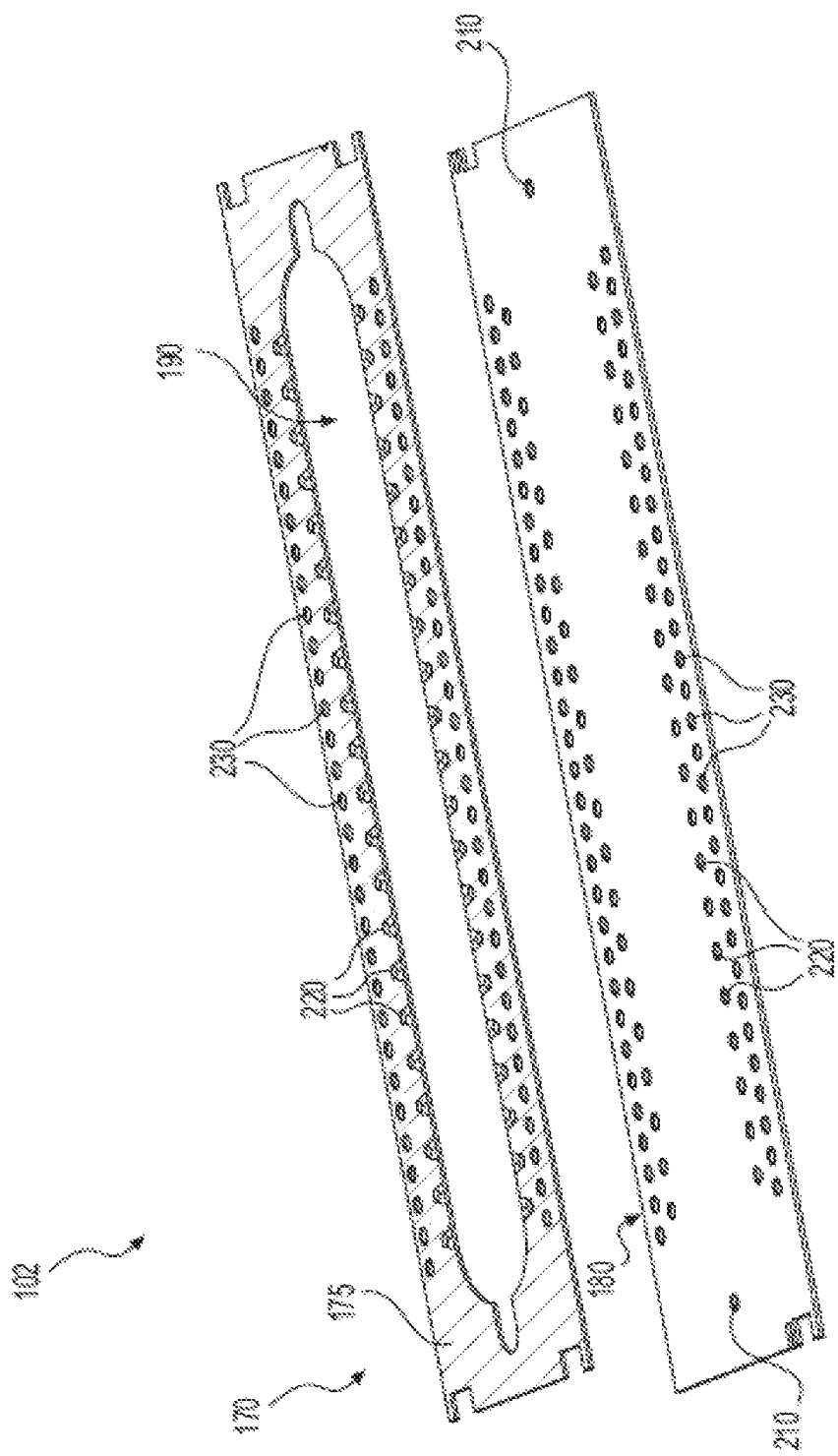
FIG. 3 is a perspective view of a base and a frame of a bipolar plate assembly, according to an exemplary embodiment.

In some embodiments, each bipolar plate 102 may be formed of at least two pieces or components. For example, bipolar plate 102 may include a frame 170 and a base 180. FIG. 3 shows one embodiment of a two-component bipolar plate 102, having a frame 170 and a base 180. Frame 170 may define a void 190 configured to receive one or more portions of electrochemical cell 110. In some embodiments, frame 170 and base 180 may be one integrated piece, for example, formed from a single piece, which defines both frame 170, base 180.

As shown in FIG. 3, frame 170 and base 180 may be generally planar and have a generally rectangular profile. In some embodiments, frame 170 and base 180 may have another shape, for example, a square, a "race-track" (i.e., a substantially rectangular shape with semi-elliptical lateral sides), circle, oval, elliptical, or other shape. The shape of frame 170 and base 180 may correspond to the other components of electrochemical cell 110 (e.g., cathode, anode, PEM, flow structure, etc.) or electrochemical cell stack.

Frame 170 and base 180 may be configured for coplanar engagement. For example, frame 170 and base 180 may be releasably coupled, fixedly attached, or otherwise adjacently arranged. One or more engagement mechanisms may be used including, for example, bonding material, welding, brazing, soldering, diffusion bonding, ultrasonic welding, laser welding, stamping, riveting, resistance welding, sintering, and/or compressing. In some embodiments, the bonding material may include an adhesive. Suitable adhesives include, for example, glues, epoxies, cyanoacrylates, thermoplastic sheets (including heat bonded thermoplastic sheets) urethanes, anaerobic, UV-cure, and other polymers. In some embodiments, frame 170 and base 180 may be coupled by friction fit. In some embodiments, frame 170 and base 180 may be releasably coupled using fasteners, for example, screws, bolts, clips, or other similar mechanisms. In some embodiments, compression rods and nuts may pass through bipolar plates 102 or along the outside and be used to compress frame 170 and base 180 together as electrochemical cell 110 or a plurality of electrochemical cells 110 are compressed to form stack 100.

In some embodiments, frame 170 and base 180 may help define a plurality of different pressure zones, for example, a plurality of seals may define one or more different pressure zones (e.g., a high pressure zone, an intermediate pressure zone, low pressure zone, etc.). Hydrogen within a high pressure zone of electrochemical cell 110 may be compressed to a pressure greater than, for example, about 10,000 psi, about 15,000 psi, about 20,000 psi, about 25,000 psi, about 30,000 psi, or about 35,000 psi. The arrangement of seals may be a cascade seal configuration (i.e., one within the other). The cascade seal configuration may provide several advantages. For example, the cascade seal configuration may limit the potential of high pressure hydrogen escaping electrochemical cell 110 by providing seal redundancy in the form of multiple layers of sealing protection.

As shown in FIG. 3, frame 170 and or base 180 may include a plurality of different ports. For example, base 180 may include high pressure ports 210 configured to supply or discharge a fluid from one or more zones (e.g., a high pressure zone) of electrochemical cell 110. High pressure ports 210 may be in fluid communication with high pressure ports of adjacent electrochemical cells in a multi-cell electrochemical stack. In some embodiments, frame 170 and base 180 may also include a first plurality of ports 220 and a second plurality of ports 230. In some embodiments, the first plurality of ports 220 may be configured to discharge fluid collected and/or contained within different pressure zones of electrochemical cell 110. In some embodiments, the second plurality of ports 230 may be configured to direct coolant fluid through the corresponding electrochemical cell 110.

In some embodiments, frame 170 and base 180 may be formed of the same materials or different materials. For example, frame 170 and base 180 may be formed of a metal, such as, stainless steel, titanium, aluminum, nickel, iron, etc., or a metal alloy, such as, nickel chrome alloy, nickel-tin alloy, Inconel, Monel, Hastelloy, or a combination there of. In some embodiment, frame 170 may also be formed of polymers, composites, ceramics, or any material capable of handling the compressive load, force, and/or pressure applied to stack 100 upon assembly.

According to an exemplary embodiment, as shown in FIG. 2, bipolar plates 102 may include a polymeric coating 175. For example, as shown in FIG. 2, a polymeric coating 175 may be applied to one or more surface of frame 170. Polymeric coating 175 may be applied to the surfaces of frame 170 contacting base 180 as well as the surfaces contacting the other portions of electrochemical cell 110. Polymer coating 175 may be, for example, a polymer powder coating.

In some embodiments, polymeric coating 175 may be applied to one or more surfaces of frame 170 and/or base 180. For example, as shown in FIG. 3, polymeric coating 175 may be applied to a first surface of frame 170 opposite base 180. In some embodiments, polymeric coating 175 may be applied to both surfaces of frame 170 as well as the edges extending between the two surfaces.

Polymeric coating 175 may be applied to frame 170 and/or base 180 by a variety of techniques, for example, laminating, spray coating, or dip coating. The dimensions of polymeric coating 175 including the shape, thickness, and width may vary, and may be based on the dimensions of electrochemical cell 110 and bipolar plate 102. The thickness of polymer coating 175 may range, for example, from about 0.005 inches to about 0.0015 inches, from about 0.0005 inches to about 0.001 inches, from about 0.001 inches to about 0.0015 inches, from about 0.001 inches to about 0.002 inches, from about 0.001 inches to about 0.0025 inches, from about 0.002 inches to about 0.003 inches, from about 0.0025 inches to about 0.003 inches, or from about 0.003 inches to about 0.0035 inches.

In some embodiments, polymeric coating 175 may include, for example, Teflon™, Torlon®, Xylan™ polyether ether ketone (PEEK), polyethyleneimine (PEI), polyethylene terephthalate (PET), polycarbonate (PC), polyimide, parylene, and polysulfone. In some embodiments, polymeric coating 175 may have a yield strength of between, for example, about 4,000 psi and about 15,000 psi, about 5,000 psi and about 12,500 psi, about 5,000 psi and about 10,000 psi. The polymer materials may be acid resistant and may not leach materials that are harmful to the operation of electrochemical cell 110. In some embodiments, the composition of polymeric powder coating 175 may include, for example, a composition of fluoropolymers and reinforcing binders.

Polymeric coating 175 may be configured to reduce the complexity of manufacturing and assembly of bipolar plates 102. According to an exemplary embodiment, polymeric coating 175 may be multifunctional. For example, polymeric coating 175 may be configured to form one or more seals, act as an electrical insulator, and/or a corrosion protection layer.

According to an exemplary embodiment, polymeric coating 175 may form one or more seals, which are configured to seal the various pressure zones, ports, and compartments of bipolar plate 102 and electrochemical cell 110. When a compressive load is applied to the bipolar plate (e.g., frame 170 and base 180), polymeric coating 175 may deform and create a seal between the two adjacent surfaces. A minimum compressive pressure applied may be greater than the yield strength of the material of polymeric coating 175 such that the material of polymeric coating 175 adequately deforms to create the seal. In some embodiments, the minimum compressive pressure applied may be less than the yield strength of the material of polymeric coating 175, for example, when the sealing surfaces are cleaned and polished. The compressive pressure, which forms the seal may be applied prior to or during assembly of the electrochemical cell and/or stack.

Utilizing polymeric coating 175 to form one or more seals within electrochemical cell 110 may reduce the manufacturing and assembly complexity. For example, glands or grooves on the surfaces of frame 170 and/or base 180 used with traditional elastomeric seals may be eliminated. Eliminating the glands or grooves may allow frame 170 and/or base 180 to be thinner, reduce the amount of machining and/or fabrication required, and increase the area of a sealing surface between frame 170 and base 180, which may reduce the compressive pressure that frame 170 and/or base 180 need to withstand. In addition, laminated or spray coated polymeric seals may be tightly bonded to frame 170 and/or base 180 and thus may be firmly held in place. Polymeric coating 175 may allow lower cost of fabrication due to less machining of the bipolar plates 102, lower application cost, and reduced material of the bipolar plates 102.

Traditionally, elastomer seals (e.g., O-rings) have been used for sealing the different pressure zones between frame 170 and base 180 as well as the other compartments and ports within electrochemical cell 110. Elastomers are often a reliability issue in a high pressure system. In addition to making the electrochemical cell less robust and tolerant, elastomeric seals need to be either die cut, hand placed, over-molded, or deposited using an x-y table and then cured. Further, elastomer seals may require either frame 170 or base 180 to have glands or grooves on the surface. Although elastomer seals can be bonded into the grooves, they may slip out of place during fabrication, assembly, and/or during operation. In addition, elastomeric seals may suffer from explosive decompression when used in certain applications, for example, high pressure applications as described herein.

According to an exemplary embodiment, polymeric coating 175 may be capable of sealing different pressure zones and or ports, such as, for example, a low pressure zone, withstanding pressure of about 30 psi, about 20 psi, about 10 psi, or less. In some embodiments, polymeric coating 175 may be capable of sealing an intermediate pressure zone, withstanding pressure of about 5,000 psi, about 4,000 psi, about 3,000 psi, or less. In some embodiments, polymeric coating 175 may be capable of sealing a high pressure zone, withstanding pressure in excess of about 5,000 psi, about 10,000 psi, about 15,000 psi, about 20,000 psi, about 25,000 psi, about 30,000 psi, about 35,000 psi, or about 40,000 psi. Polymeric coating 175 may be configured to seal for long periods of time (e.g., greater than 10 years) and withstand many pressure cycles (e.g., greater than 1,000 cycles). This allows the hydrogen formed at cathode 7C to be highly compressed.

As described above, polymeric coating may provide additional advantageous including, for example, acting as an electrical insulator, and/or a corrosion protection layer. Thin sheets of low-cost metal, for example, aluminum, which can be easily formed to yield compact volume is an attractive material for bipolar plates, but corrosion of the aluminum from the electrochemical environment is a problem. Corrosion affects the performance and cell life of an electrochemical cell. To address the corrosion, in traditional fuel cells, the bipolar plate is sometimes made of a clad material, for example, aluminum clad with stainless steel on one or more regions. Cladding may provide the advantages of both metals, for example, in the case of a bipolar plate fabricated from stainless steel-clad aluminum, the stainless steel protects the aluminum core from corrosion during cell operation, while providing the superior material properties of aluminum, such as, high strength-to-weight ratio, high thermal and electrical conductivity, etc. However, cladding of the material increasing the cost and adds additional processing steps to the manufacturing process. Other alternatives, such as surface modification methods (e.g., oxide passivation) and other surface coatings (e.g., metal oxides, metal carbides, metal nitrides, and carbon-based coating), used to address corrosion protection, can also be costly and increase manufacturing complexity.

Polymer coating 175, as described herein may be configured (e.g., formulated) to function as the corrosion protective layer for one or more portions (e.g., frame 170 and/or base 180) of bipolar plate 102. For example, polymer coating 175 may be applied to the non-conducting portions of frame 170 and base 180. In some embodiments, these portions may include all surfaces of frame 170 and the portions surrounding void 190, may mate with frame 170. Utilizing polymer coating 175 may eliminate the need for cladding or other corrosion protective layers.

As described herein, polymeric coating 175 may be configured to act as an electrical insulator. In some embodiments, frame 170 may be configured to be generally non-conductive by selecting a non-conductive material for frame 170, thereby reducing the likelihood of shorting between the electrochemical cell. However, the options of a non-conductive material that is also strong enough to handle the compressive pressure are limited and may be costly. Polymeric coating 175 increases the material options for frame 170 by acting as an electrical insulator. Accordingly, in some embodiments, frame 170 may be formed of a metal (e.g., aluminum, stainless steel, or other similar metals) and coated with polymeric coating 175 to limit or prevent electrical conduction. Traditional insulators used in electrochemical cells include, for example, polymer films or anodization, but both of which are less desirable than polymeric coating 175, as described herein. For example, polymer films add an additional component for manufacturing, assembly, and alignment. With regard to anodization, to provide robust insulation, the anodization must be thick (e.g., greater than 0.001 inches), which adds cost while not providing an adequate solution for corrosion protection.

In some embodiments, as described herein, polymeric coating 175 may be configured to simultaneously act as just an electrical insulator and a seal, and electrical insulator and corrosion protection, or a seal and corrosion protection. Polymeric coating 175 may be chemically compatible with the environment of electrochemical cell 110. To improve adhesion of polymeric coating 175, frame 170 and/or base 180 may be treated (e.g., chromate conversion coating or thin film anodization) to clean the surface before polymer coating 175 is applied.

Factors and properties to be considered in selecting the material and geometry for a component (e.g., polymeric coating 175, frame 170, and base 180), include compressive load requirements, material compatibility, sealing pressure requirement, cost of material, cost of manufacturing, and ease of manufacturing. The variety of materials made suitable by polymeric coating 175 described herein may allow for the selection of less expensive materials and less costly manufacturing. Utilizing the polymeric coating 175 as described herein may reduce the design complexity, improve manufacturability, and reduce cost by reducing component count and number of processing steps.

Other embodiments of the present disclosure will be apparent to those skilled in the art from consideration of the specification and practice of the present disclosure herein. It is intended that the specification and examples be considered as exemplary only, with a true scope and spirit of the present disclosure being indicated by the following claims.

What is claimed is:

1. A bipolar plate for an electrochemical cell, comprising:
a metal frame and a base; and
a polymeric coating applied to all surfaces of the metal frame;
wherein a first portion of the polymeric coating applied to a first surface of the metal frame is configured to contact the base and a second portion of the polymeric coating applied to a second surface of the metal frame opposite the first surface is configured to contact a second base of an adjacent bipolar plate.

2. The bipolar plate of claim 1, wherein the polymeric coating is an electrical insulator within the electrochemical cell.

3. The bipolar plate of claim 1, wherein the polymeric coating forms a seal within the electrochemical cell when compressed.

4. The bipolar plate of claim 1, wherein the polymeric coating is a corrosion protection layer.

5. The bipolar plate of claim 1, wherein the polymeric coating is at least two of the following:
an electrical insulator of the electrochemical cell;
a seal within the electrochemical cell; and
a corrosion protection layer.

6. The bipolar plate of claim 1, wherein the polymeric coating is:
an electrical insulator of the electrochemical cell;
a seal within the electrochemical cell; and
a corrosion protection layer.

7. The bipolar plate of claim 1, wherein the polymeric coating includes fluoropolymers and reinforcing binders.

8. The bipolar plate of claim 3, wherein the seal forms by compressing the bipolar plate to a pressure greater than or equal to the yield strength of the polymeric coating.

9. The bipolar plate of claim 8, wherein the bipolar plate and the polymeric coating are compressed at least to between about 4,000 psi to about 15,000 psi.

10. The bipolar plate of claim 1, wherein the polymeric coating ranges from about 0.005 inches to about 0.0015 inches thick.

11. A bipolar plate of an electrochemical cell, consisting essentially of:
   a metal frame and a base; and
   a polymeric coating applied to all surfaces of the metal frame;
   wherein a first portion of the polymeric coating applied to a first surface of the metal frame is configured to contact the base and a second portion of the polymeric coating applied to a second surface of the metal frame opposite the first surface is configured to contact a second base of an adjacent bipolar plate;
   wherein the polymeric coating is:
      an electrical insulator of the electrochemical cell;
      a seal of the electrochemical cell; and
      a corrosion protection layer.

12. The bipolar plate of claim 11, wherein the polymeric coating forms the seal when the frame and the base are compressed, thereby compressing the polymeric coating to a pressure greater than or equal to the yield strength of the polymeric coating.

13. The bipolar plate of claim 12, wherein the bipolar plate and the polymeric coating are compressed at least to between about 4,000 psi to about 15,000 psi.

14. The bipolar plate for an electrochemical cell of claim 1, wherein the frame defines a void configured to contain a membrane electrode assembly of the electrochemical cell; and
   wherein the membrane electrode assembly is contained within the void and enclosed by the base of the bipolar plate and the second base of the adjacent bipolar plate.

15. The bipolar plate for an electrochemical cell of claim 1, wherein the polymeric coating is applied to a surface of the base contacting the metal frame.

16. An electrochemical cell comprising,
   a membrane electrode assembly, wherein the membrane electrode assembly comprises an anode, a cathode, and a proton exchanger membrane disposed therebetween;
   a first bipolar plate comprising a metal frame and a first base, wherein the frame defines a void configured to contain the membrane electrode assembly; and
   a polymeric coating applied to all surfaces of the metal frame;
   wherein the membrane electrode assembly is contained within the void and enclosed by the first base of the first bipolar plate and a second base of a second bipolar plate adjacent the first bipolar plate;
   wherein a first portion of the polymeric coating applied to a first surface of the metal frame is configured to contact the first base and a second portion of the polymeric coating applied to a second surface of the metal frame opposite the first surface is configured to contact the second base of the second bipolar plate adjacent the first bipolar plate.

* * * * *